United States Patent

Farooque et al.

[11] Patent Number: 5,773,161
[45] Date of Patent: Jun. 30, 1998

[54] BIPOLAR SEPARATOR

[75] Inventors: Mohammad Farooque, Huntington; Joel David Doyon, Bantam; Michael Thomas Primerano, Torrington, all of Conn.; G.B. Kirby Meacham, Shaker Heights, Ohio

[73] Assignee: Energy Research Corporation, Danbury, Conn.

[21] Appl. No.: 725,286

[22] Filed: Oct. 2, 1996

[51] Int. Cl.[6] .................................................. H01M 2/00
[52] U.S. Cl. ............................ 429/34; 429/129; 429/130; 429/146; 429/147; 429/39
[58] Field of Search .............................. 429/34, 129, 130, 429/146, 147, 39

[56] References Cited

U.S. PATENT DOCUMENTS

| 4,169,917 | 10/1979 | Baker et al. | 429/26 |
|---|---|---|---|
| 4,514,475 | 4/1985 | Mientek | 429/35 |
| 4,604,331 | 8/1986 | Louis | 429/35 |
| 4,609,595 | 9/1986 | Nikols | 429/35 |
| 4,689,280 | 8/1987 | Gionfriddo | 429/34 |
| 4,818,639 | 4/1989 | Kunz | 429/34 |
| 5,175,062 | 12/1992 | Farooque et al. | 429/20 |
| 5,232,792 | 8/1993 | Reznikov | 429/14 |
| 5,298,342 | 3/1994 | Laurens et al. | 429/35 |

Primary Examiner—Bruce F. Bell
Attorney, Agent, or Firm—Robin, Blecker & Daley

[57] ABSTRACT

A bipolar separator which is formed from a plate having opposing first and second surfaces which are compatible with fuel gas and an oxidant gas, respectively. The plate is formed with a central area, first and second opposing troughs extending from first and second opposing sides of the central area, and third and fourth opposing troughs extending from third and fourth opposing sides of the central area. In the regions of its third and fourth sides, the central area is bent over and around so that the third and fourth troughs face and are adjacent to the central area. The first surface of the separator defines the extent of a first surface of the central area and the extents of the inner surfaces of the troughs of the separator. Similarly, the second surface of the separator defines the extents of a second opposing surface of central area and the extents of the outer surfaces of the troughs.

30 Claims, 2 Drawing Sheets

BIPOLAR SEPARATOR

BACKGROUND OF THE INVENTION

This invention relates to fuel cell assemblies and, in particular, to improved bipolar separators used in such assemblies.

In a typical fuel cell assembly, fuel cell units are stacked one on top of the other to form a fuel cell stack. Each of the fuel cell units includes an electrolyte component sandwiched between anode and cathode components. The anode and cathode components, in turn, include anode and cathode electrodes and corrugated anode and cathode current collectors.

One face of the anode component abuts the electrolyte component while the other face abuts the anode current collector. Similarly, one face of the cathode electrode abuts the electrolyte component, while the other face abuts the cathode current collector.

First and second separator plates then abut the anode and cathode current collectors respectively. The separator plates are bipolar in character having a cathode face which is compatible with oxidant gas and an anode face which is compatible with fuel gas. The first separator plate is thus situated with its anode face abutting the anode current collector of the anode component. The second separator plate, in turn, is situated with its cathode face abutting the cathode current collector of the cathode element.

The first and second separator plates form with the adjacent anode and cathode current collectors anode and cathode gas channels. These channels receive the respective fuel and oxidant gases which are chemically converted by the fuel cell unit to electricity.

While the first and second bipolar separators complete a fuel cell unit, each also acts as a bipolar separator for the preceding and succeeding fuel cell units in the fuel cell stack. Thus, in the case of the first separator plate, its cathode face will abut with the cathode current collector of the cathode element of the preceding fuel cell unit. In the case of the second separator plate, its anode face will abut with the anode current collector of the anode element of the succeeding fuel cell unit.

In one form of bipolar separator in use to date, the separator comprises a stainless steel plate having a nickel clad on one surface. The stainless steel surface of the plate is an oxidant gas compatible surface, while the nickel clad surface is a fuel gas compatible surface. This plate is typically subjected to an expensive and complex bending process which requires separately bending each of the four sides of the plate.

With the nickel surface facing up, opposing first and second sides are bent up and around so that they form two rails with the stainless steel surface of each rail facing outward. These rails form wet seals with the electrolyte element and, as a result, prevent any fuel gas from leaking out of the anode element. The formed stainless steel wet seals are coated with an aluminization layer which protects these surfaces in contact with the electrolyte matrix from excessive corrosion. The wet seals also protect the stainless steel surfaces of the cathode compartment from being contacted by the fuel gas. Additionally, the outside air environment does not adversely affect these rails, since their aluminized stainless steel surfaces are compatible with oxidant gas.

The third and fourth sides of the separator plate are bent down and around forming two further rails with the nickel clad surface of the rails outward or exposed. These rails also form wet seals with the electrolyte element which prevent leakage of oxidant gas from the oxidant element and which protect the nickel surfaces in the anode compartment from contact with the oxidant gas. However, while the rails are protected from the oxidant gas in the cathode element, the nickel surfaces of the rails are still exposed to the air in the outside environment. If this is allowed to occur, the oxidant gas in the air will oxidize and corrode the nickel clad. Direct coating of the nickel surface with an aluminization layer has proven unsuccessful due to the formation of unstable nickel aluminide compounds which spall off during fuel cell operation. Accordingly, to prevent this, the nickel clad is removed from the rail surfaces to uncover the underlying electrolyte oxidant compatible stainless steel which is then aluminized for electrolyte corrosion protection. The removal process used for the nickel clad, however, is costly and typically has adverse environmental implications. A usual process used is chemical etching.

As can be appreciated, the aforesaid procedures of removing the nickel clad from the plate and bending the bipolar plate increase the overall cost of each plate and, therefore, each fuel cell unit. Reducing or eliminating these procedures would thus be highly advantageous for the fuel cell manufacturer.

Another difficulty encountered with fuel cell units is electrolyte loss and/or maldistribution. This especially occurs when a large number of units are arranged in a stack. During operation, the fuel cell units experience electrolyte losses from vaporization, reaction with corrosion products and creepage or migration typically from the positive (cathode) end to the negative (anode) end of the stack. Such electrolyte movement can result in units toward the positive end of the stack being "starved" of electrolyte and those units at the negative end being "flooded" with excess electrolyte. Both conditions can result in reduced fuel cell (and stack) performance and in extreme cases, shortened useful operating life.

Typically, the cell electrolyte is stored in either one or both of the electrodes pore volumes of the fuel cell units prior to stack assembly. This limits the amount of cell electrolyte to that which can be accommodated by the electrodes pore volumes. Based upon a typical cell design, electrolyte modeling studies predict this amount is insufficient for 40,000 hours of fuel cell operation. Some electrolyte can be stored in the cathode side corrugated current collector, however, this can result in increased resistance to oxidant gas flow during stack conditioning resulting in high cell and manifold back pressures. Accelerated corrosion of the corrugated material may also result if excess electrolyte is not wicked up by the active components. It thus would be highly desirable to provide in each fuel cell unit a component which can provide either a "reservoir" of electrolyte for those cells which experience electrolyte losses or a "sink" of electrolyte absorbing material for those cells which gain electrolyte during fuel cell operation.

It is, therefore, an object of the present invention to provide a bipolar separator for a fuel cell unit which overcomes the above disadvantages.

It is a further object of the present invention to provide a bipolar separator which is simpler to fabricate, while being resistant to corrosion.

It is a further object of the present invention to provide a bipolar separator which assists in electrolyte management in a fuel cell stack.

SUMMARY OF THE INVENTION

In accordance with the principles of the present invention, the above and other objectives are realized in a bipolar separator which is formed from a plate having opposing first and second surfaces which are compatible with fuel gas and an oxidant gas, respectively. The plate is formed with a central area, first and second opposing troughs extending from first and second opposing sides of the central area, and third and fourth opposing troughs extending from third and fourth opposing sides of the central area.

In the regions of its third and fourth sides, the central area is bent over and around so that the third and fourth troughs face and are adjacent to the central area. The first surface of the separator defines the extent of a first surface of the central area and the extents of the inner surfaces of the troughs of the separator. Similarly, the second surface of the separator defines the extents of a second opposing surface of central area and the extents of the outer surfaces of the troughs.

With this configuration for the bipolar separator, the separator can be formed by stamping or drawing and with a single bending operation. Moreover, the rails of the separator are formed by the troughs whose surface areas exposed to the air of the environment are comprised of the second surface, which is oxidant gas compatible. No processing for removal of the material of the separator is thus necessary. An overall simpler and less expensive bipolar separator thus results.

In a further aspect of the invention, the first and second troughs of the bipolar separator are adapted to permit dispersal or absorption of electrolyte. In particular, these troughs are provided with apertures through which electrolyte can be delivered for dispersal or received for absorption. For cell units in which excess electrolyte accumulates, an electrolyte absorbing material can be arranged in the first and second troughs. Excess electrolyte can thus wick through the apertures in the troughs and be absorbed. On the other hand, for cell units which become depleted of electrolyte, excess electrolyte can be disposed in the troughs and wicked through the apertures, as the electrolyte in the cell unit becomes depleted.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1A:
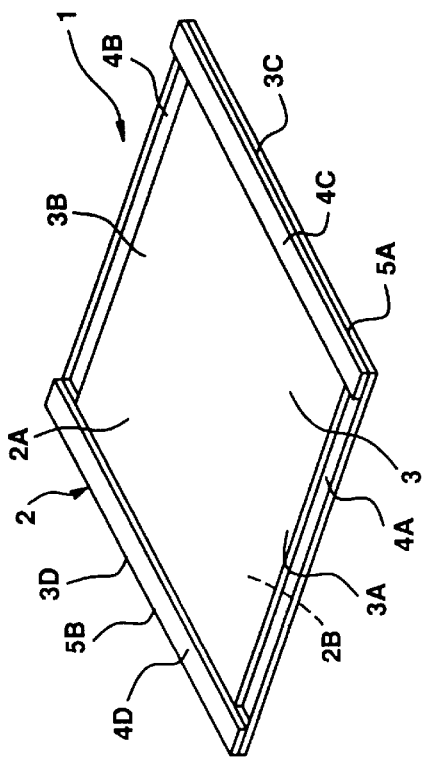
FIGS. 1A and 1B show a bipolar separator in accordance with the principles of the present invention.
Figure 1B:
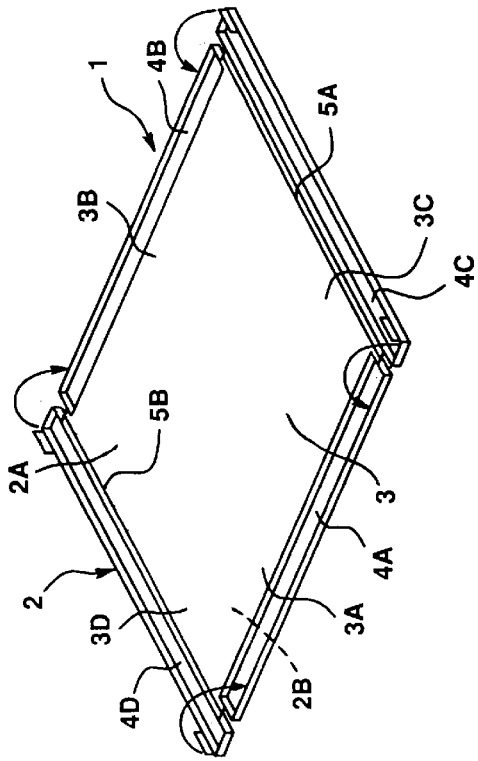

FIGS. 1A and 1B show a bipolar separator 1 in accordance with the principles of the present invention. As shown, the separator 1 comprises a plate 2 having first and second surfaces 2A and 2B. The first surface is compatible with a fuel gas (e.g., a hydrogen) environment and the second surface is compatible with an oxidant gas environment. Typically, the plate 2 can be formed from stainless steel, which is compatible with oxidant gas, and which is provided with a laminate or cladding, such as nickel, which is compatible with fuel gas to form the first surface.

As can be seen, the plate 2 includes a central area 3 having first and second opposing sides 3A and 3B and third and fourth opposing sides 3C and 3D. Extending from each opposing side is a trough or box-like region. Thus, opposing troughs 4A and 4B extend from sides 3A and 3B, respectively, and opposing troughs 4C and 4D extend from sides 3C and 3D, respectively.

The fuel gas compatible surface 2A of the separator 1 thus defines the extent of one surface of the central area and the extents of the inner surfaces of the troughs 4A–4D. Similarly, the oxidant gas compatible surface 2B of the separator 1 defines the extent of the other surface of the central area and the extents of the outer surfaces of the troughs 4A–4D.

As shown in FIG. 1B, the troughs 4C and 4D are also bent over and around along fold lines 5A and 5B at sides 3C and 3D of the central area 3. These troughs, thus, in the completed separator 1 face and abut the central area 3 at the sides 3C and 3D.

With this configuration of the bipolar separator 1, the troughs 4A and 4B form rails which result in wet seals for the cathode element when the separator is used in a fuel cell unit. The troughs 4C and 4D, in turn, form rails which result in wet seals for the anode element of the fuel cell unit. Moreover, due to the manner of forming the separator, all the surfaces of the rails exposed to the outside air environment are parts of the second surface, i.e., are stainless steel and, therefore oxidant gas compatible. As a result, corrosion resistance of the wet seal areas is maintained without the need to remove any nickel clad from the separator.

The separator plate of FIGS. 1A and 1B can be made by a simple stamping or drawing operation, combined with, or followed by, a limited bending operation. Since bending is only required on the sides 3C and 3D of the central area 3, the plate need only be oversized in two directions. Moreover, since all exposed surfaces of the rails are of oxidant compatible material, the rails need not be further processed to achieve this.

Figure 2:
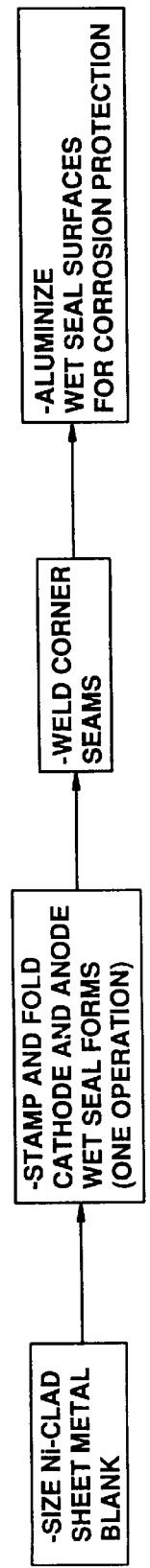
FIG. 2 shows a flow diagram depicting the steps for forming the bipolar separator of FIGS. 1A and 1B.

FIG. 2 shows the processing steps for forming the separator plate. In a first step, a metal blank is first sized. The sized blank is then conveyed to a stamping and folding operation, in which the troughs 4A–4B are formed and the troughs 4C–4D are formed and folded into position. Following this, the corner seams of adjacent troughs are welded and then the exposed rail surfaces are aluminized to provide additional corrosion resistance to the oxidant compatible surfaces. This completes the plate processing.

Figure 3:
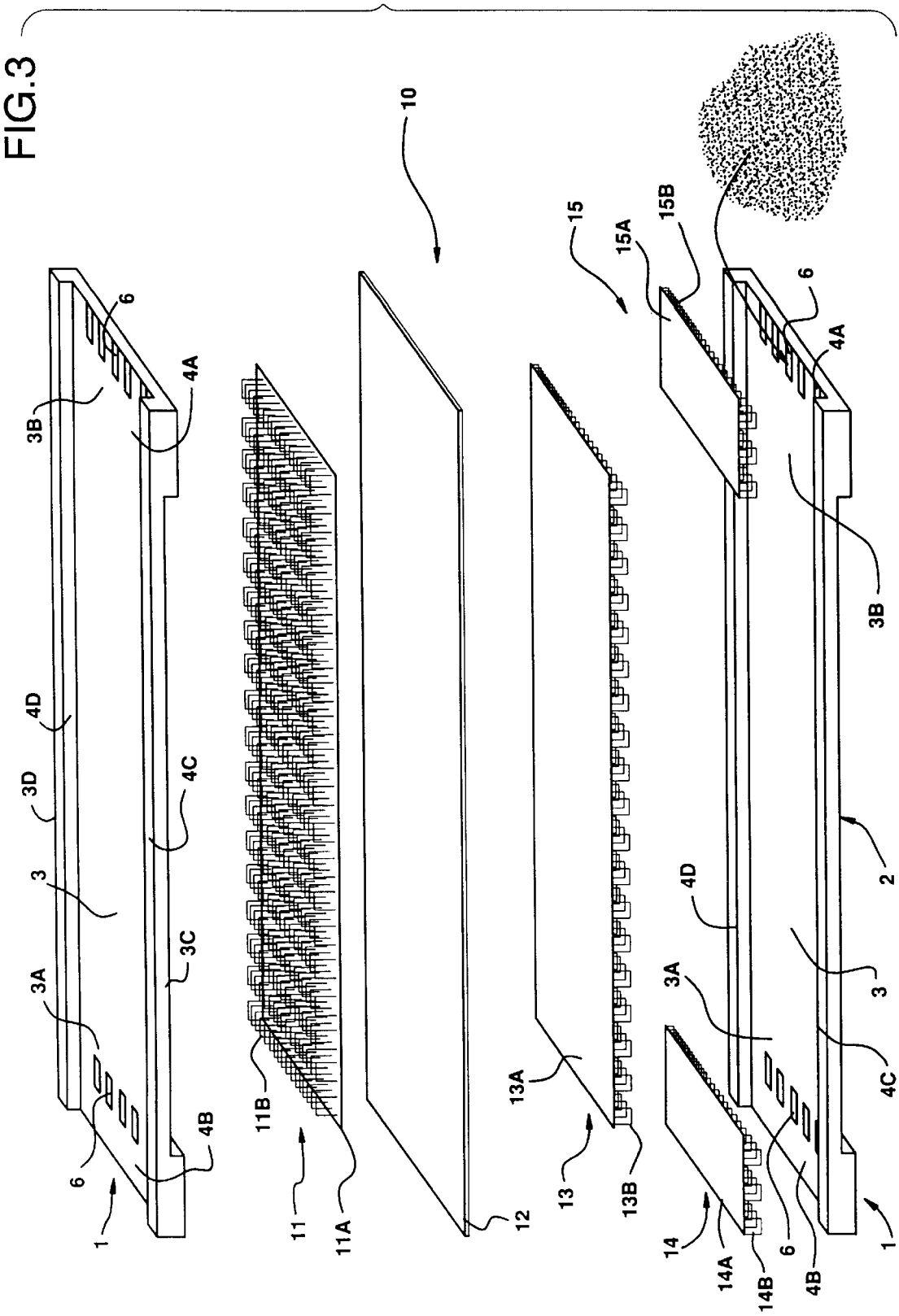
FIG. 3 shows the formation of a fuel cell unit utilizing the bipolar separator shown in FIGS. 1A and 1B.

FIG. 3 shows a fuel cell unit 10 comprising upper and lower bipolar plates 1 as shown in FIGS. 1A and 1B. The fuel cell unit further includes a cathode element 11 comprised of a cathode electrode 11A and a cathode current collector 11B having a surface abutting one surface of the cathode electrode. The cathode element 11 extends over the length and width of the central area 3 of the upper bipolar separator 1. In particular, the longitudinal ends of the element abut the troughs 4A and 4B and the lateral ends extend to the sides 3C and 3D of the central area 3. The height of the cathode element 11 is equal to that of the troughs 4A and 4B, so that the element 11 and troughs form a flush surface. An electrolyte matrix or tile 12 abuts and extends over the entirety of this surface.

An anode element 13 formed of an anode electrode 13A and a corrugated anode current collector 13B follow the matrix element 12. One face of the anode electrode 13A abuts the matrix 12, while the other face abuts and supports one surface of the anode current collector 13B. The other surface of the anode current collector 13B rests on the central area 3 of the lower separator plate 1.

The anode element 13 extends laterally between the troughs 4C and 4D of the lower separator plate 1 and longitudinally to the ends 3A and 3B of the central area 3 of this plate. Spacer elements 14 and 15 fit into the latter troughs so that they are flush with the central area 3 of the separator plate 1.

The spacer elements 14 and 15 include separator segments 14A and 15A made of solid nickel or inconel sheet material and current collector segments 14B and 15B. The elements 14B and 15B are of sufficient height to accommodate the depth of the troughs 4A and 4B.

The anode element 13 sits on a flat surface formed by the combined central area 3 of the separator plate and the flat surfaces 14A and 15A of the spacer elements 14 and 15. The anode electrode 13A of the anode element 13 provides a flat surface for seating the lower surface of the electrolyte matrix 12.

As can be appreciated, the troughs 4A and 4B of the upper separator plate 1 and the troughs 4C and 4D of the lower separator plate 1 act as rails and the surfaces of these rails form wet seals with the matrix 12. These wet seals, in turn, keep the oxidant gas and fuel gas from leaking from the gas chambers formed by the cathode and anode elements and the separator plates, so as to prevent gas cross-over and gas escape from the fuel cell unit. Moreover, the exposed surfaces of the rails are all formed of an oxidant compatible material, i.e., aluminized stainless steel, and, therefore, are highly resistant to oxidation and corrosion from the air in the environment.

In a further aspect of the invention, the bipolar separator of the invention is further adapted to promote electrolyte management for the fuel cell unit. This is shown in FIG. 3 wherein the troughs 4A and 4B of the upper and lower bipolar separators 1 are adapted to permit either dispersing of electrolyte to or absorbing of electrolyte from the electrolyte matrix 12 of the unit. Thus, in FIG. 3, the troughs 4A and 4B of each separator 1 are provided with through apertures 6 which provide a means through which electrolyte can be wicked to or from the matrix 12.

If the cell unit 10 is going to be situated in a fuel cell stack where the unit will be starved for electrolyte, i.e., at the positive (cathode) side of the stack, the troughs 4A and 4B can be filled with electrolyte. In such case, the troughs will act as a reservoir for the fuel cell unit 10 and electrolyte will wick through the apertures 6 as the electrolyte in the matrix 12 of the cell unit becomes depleted.

The electrolyte used to fill the troughs 4A and 4B can be in a powder, granule or paste form. Moreover, it can be contained in a porous ceramic bed of a given pore structure so as to supply electrolyte to the cell unit 10 as required throughout the life of the unit. By making the pore structure of this ceramic material slightly larger than that of the matrix 12, electrolyte will be drawn through the apertures 6 into the matrix 12 at the wet seal areas where it is most needed. This will occur without adversely affecting the anode or cathode elements, which may be performance sensitive to excess electrolyte, to maintain complete pore volume filling required for fuel cell operation.

In this way, electrolyte will be released to the matrix 12 when needed without flooding the fuel cell unit 10 with an oversupply of electrolyte at the beginning of stack operation when it is not needed. Based on a typical design, it has been calculated that an additional 5 to 8% of the total cell electrolyte for 40,000 hours of operation can be stored in this manner.

Alternatively, if the fuel cell unit 10 is to be situated in the fuel cell stack where it will become flooded with electrolyte, i.e., at the negative (anode) side of the stack, the troughs 4A and 4B can be filled with a porous member of an electrolyte absorbing material such as ceramic to act as a sink for excess electrolyte. Typical ceramics might be $\gamma$-LiAlO$_2$ or Al$_2$O$_3$.

By making the pore structure of the porous ceramic member slightly larger than that of the electrolyte, excess electrolyte in the matrix 12 will be wicked through the apertures 6 into the pore surfaces of the ceramic member. The member will thus act as a sink for the excess electrolyte, preventing electrode flooding and resultant performance decay.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A bipolar separator for use with a fuel cell which is supplied a fuel gas and an oxidant gas, the bipolar separator comprising:

a plate having opposing first and second surfaces which are compatible with a fuel gas and an oxidant gas, respectively, said plate further having a central area, opposing first and second trough areas extending from opposing first and second sides of said central area and opposing third and fourth trough areas extending from opposing third and fourth sides of said central area, said first surface of said plate defining the extent of one surface of said central area and the extents of the inner surfaces of said first, second, third and fourth trough areas, said second surface of said plate defining the extent of another surface of said central area opposing said one surface of said central area and the extents of the outer surfaces of said first, second, third and fourth trough areas, said central area being bent at said third and fourth sides so that said third and fourth trough areas face and abut said one surface of said central area.

2. A bipolar separator in accordance with claim 1 in which:

said first surface comprises nickel; and
said second surface comprises stainless steel.

3. A bipolar separator in accordance with claim 1 in which:

one or more of said first and second trough areas include through apertures.

4. A bipolar separator in accordance with claim 3 in which:

one or more of said first and second trough areas are adapted to disperse electrolyte by wicking electrolyte through said through apertures.

5. A bipolar separator in accordance with claim 4 further comprising:

an electrolyte disposed in said one or more of said first and second trough areas.

6. A bipolar separator in accordance with claim 5 further comprising:

a porous ceramic bed disposed in each of said one or more of said first and second trough areas containing said electrolyte and holding the electrolyte of the trough area in which said bed is disposed.

7. A bipolar separator in accordance with claim 3 further comprising:

first and second spacer elements adapted to be received in said first and second trough areas, each spacer element including channel means.

8. A bipolar separator in accordance with claim 3 in which:
one or more of said first and second trough areas are adapted to absorb electrolyte by wicking electrolyte through said through apertures.

9. A bipolar separator in accordance with claim 8 further comprising:
an electrolyte absorbing material disposed in said one or more of said first and second trough areas adapted to absorb electrolyte.

10. A bipolar separator in accordance with claim 9 in which:
said electrolyte absorbing material is a ceramic.

11. A bipolar separator in accordance with claim 10 in which:
said ceramic is one of $\gamma$-LiAlO$_2$ or Al$_2$O$_3$.

12. A bipolar separator in accordance with claim 1 wherein:
said plate is rectangular;
said central area is rectangular;
said first and second trough areas are on a first pair of opposing sides of said rectangular central area; and
said third and fourth trough areas are on a second pair of opposing sides of said rectangular central area.

13. A fuel cell assembly adapted to be supplied oxidant and fuel gases comprising:
at least a first bipolar separator, each bipolar separator including: a plate having opposing first and second surfaces which are compatible with a fuel gas and an oxidant gas, respectively, said plate further having a central area, opposing first and second trough areas extending from opposing first and second sides of said central area and opposing third and fourth trough areas extending from opposing third and fourth sides of said central area, said first surface of said plate defining the extent of one surface of said central area and the extents of the inner surfaces of said first, second, third and fourth trough areas, said second surface of said plate defining the extent of another surface of said central area opposing said one surface of said central area and the extents of the outer surfaces of said first, second, third and fourth trough areas, said central area being bent at said third and fourth sides so that said third and fourth trough areas face and abut said one surface of said central area;
an anode element extending to the ends of said first and second trough areas and between said third and fourth troughs areas of said plate of said first bipolar separator, said anode element facing said first surface of said plate of said first bipolar separator and defining therewith channels for receiving fuel gas for said anode element.

14. A fuel cell assembly in accordance with claim 13 further comprising:
an electrolyte element abutting said anode element and extending to the ends of said first and second trough areas of said plate of said first bipolar separator and to third and fourth sides of said central area of said plate of said first bipolar separator; and
a cathode element abutting said electrolyte element, said cathode element extending between said first and second trough areas and to the third and fourth sides of the central area of said plate of said first bipolar separator.

15. A fuel cell assembly in accordance with claim 14 in which:
said first surface of said plate of said first bipolar separator comprises nickel; and said second surface of said plate of said bipolar separator comprises stainless steel.

16. A fuel cell assembly in accordance with claim 14 in which:
one or more of said first and second trough areas of said plate of said first bipolar separator include through apertures.

17. A fuel cell assembly in accordance with claim 16 in which:
one or more of said first and second trough areas of said plate of said first bipolar separator are adapted to disperse electrolyte by wicking electrolyte through said through apertures.

18. A fuel cell assembly in accordance with claim 17 further comprising:
an electrolyte disposed in said one or more of said first and second trough areas of said plate of said first bipolar separator.

19. A fuel cell assembly in accordance with claim 18 further comprising:
a porous ceramic bed disposed in each of said one or more of said first and second trough areas containing said electrolyte and holding the electrolyte of the trough area in which said bed is disposed.

20. A fuel cell assembly in accordance with claim 16 wherein:
said anode element includes: a first segment extending between said first and second sides of said central area of said plate of said first bipolar separator; and first and second spacer segments abutting and received in said first and second trough areas of said plate of said first bipolar separator, said first segment and first and second spacer segments being flush with each other.

21. A fuel cell assembly in accordance with claim 16 in which:
one or more of said first and second trough areas of said plate of said first bipolar separator are adapted to absorb electrolyte by wicking electrolyte through said through apertures.

22. A fuel cell assembly in accordance with claim 21 further comprising:
an electrolyte absorbing material disposed in said one or more of said first and second trough areas adapted to absorb electrolyte.

23. A fuel cell assembly in accordance with claim 22 in which:
said electrolyte absorbing material is a ceramic.

24. A fuel cell assembly in accordance with claim 23 in which:
said ceramic is one of $\gamma$-LiAlO$_2$ or Al$_2$O$_3$.

25. A fuel cell assembly in accordance with claim 14 in which:
said plate of said first bipolar separator is rectangular;
said central area of said plate of said first bipolar separator is rectangular;
said first and second trough areas are on a first pair of opposing sides of said rectangular central area; and
said third and fourth trough areas are on a second pair of opposing sides of said rectangular central area.

26. A fuel cell assembly in accordance with claim 14 in which:
said anode element comprises an anode electrode and anode channels means attached to said anode electrode, said anode electrode abutting said electrolyte element and said anode channel means abutting said first surface of said first bipolar separator and defining therewith channels for receiving fuel gas;

and said cathode element comprises a cathode electrode and a cathode channel means attached to said cathode electrode, said cathode electrode abutting said matrix element.

27. A fuel cell assembly in accordance with claim 26 in which:

a second bipolar separator is adjacent said cathode element, the second surface of said second bipolar separator abutting the cathode channel means and defining therewith channels for receiving oxidant gas.

28. A fuel cell assembly in accordance with claim 27 in which:

said anode channel means comprises an anode current collector; and said cathode channel means comprises a cathode current collector.

29. A fuel cell assembly in accordance with claim 27 in which:

said anode element and anode channel means are segmented in a first segment and first and second spacer segments, said first segment abutting the central area of said plate of said first bipolar separator and the first and second spacer segments abutting and being received in the first and second trough areas of said plate of said first bipolar separator.

30. A fuel cell assembly in accordance with claim 29 in which:

said segment and first and second spacer segments are flush with each other and the central area of the anode compartment of the bipolar plate.

* * * * *